US010065685B2

(12) United States Patent
Rioult et al.

(10) Patent No.: US 10,065,685 B2
(45) Date of Patent: Sep. 4, 2018

(54) BODY STRUCTURE OF A MOTOR VEHICLE WITH REINFORCEMENTS FOR DISTRIBUTING THE FORCES LINKED TO A REAR SHOCK ABSORBER OF THE VEHICLE

(71) Applicant: RENAULT s.a.s., Boulogne Billancourt (FR)

(72) Inventors: Olivier Rioult, Voisins le Bretonneux (FR); Jerome Caillard, Gif sur Yvette (FR); Thierry Hlubina, Chaville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 81 days.

(21) Appl. No.: 15/113,565

(22) PCT Filed: Jan. 13, 2015

(86) PCT No.: PCT/FR2015/050071
§ 371 (c)(1),
(2) Date: Jul. 22, 2016

(87) PCT Pub. No.: WO2015/110740
PCT Pub. Date: Jul. 30, 2015

(65) Prior Publication Data
US 2017/0029037 A1 Feb. 2, 2017

(30) Foreign Application Priority Data

Jan. 23, 2014 (FR) ...................................... 14 50550

(51) Int. Cl.
*B62D 25/08* (2006.01)
*B62D 25/20* (2006.01)

(52) U.S. Cl.
CPC ......... *B62D 25/088* (2013.01); *B62D 25/087* (2013.01); *B62D 25/2027* (2013.01); *B60Y 2304/03* (2013.01); *B60Y 2306/01* (2013.01)

(58) Field of Classification Search
CPC .............................. B62D 21/11; B62D 25/088
(Continued)

(56) References Cited

U.S. PATENT DOCUMENTS 4,408,794 A 10/1983 Harasaki
4,669,777 A * 6/1987 Harasaki .............. B62D 25/088
296/203.02

(Continued)

FOREIGN PATENT DOCUMENTS

JP          9-95262 A        4/1997

OTHER PUBLICATIONS

International Search Report dated Mar. 13, 2015 in PCT/FR2015/050071 Filed Jan. 13, 2015.
(Continued)

*Primary Examiner* — Jason S Morrow
(74) *Attorney, Agent, or Firm* — Oblon, McClelland, Maier & Neustadt, L.L.P.

(57) ABSTRACT

A body structure of a motor vehicle includes two substantially parallel longitudinal reinforcing side members, a body side superstructure connected to the side members, rising above the side members and defining, on either side of the vehicle, two wheel arch housing portions of the vehicle. The two wheel arch housing portions are connected by a floor portion of the vehicle, offset vertically relative to the side members and positioned above the side members. The structure also includes at least one rear shock absorber attachment cup at each wheel arch housing portion. The at least one rear shock absorber attachment cup is assembled to the side superstructure, and assembled to a side member by
(Continued)

a raising part connecting the cup and only a portion of the side member, having a width, measured in a longitudinal direction of the vehicle, substantially equal to that of the cup.

10 Claims, 3 Drawing Sheets

(58) Field of Classification Search
USPC .............................. 296/187.11, 19.08, 203.04
See application file for complete search history.

(56) References Cited

U.S. PATENT DOCUMENTS

| | | | | |
|---|---|---|---|---|
| 5,536,035 | A * | 7/1996 | Bautz | B60G 3/20 |
| | | | | 280/124.139 |
| 2008/0150271 | A1* | 6/2008 | Kosaka | B62D 21/152 |
| | | | | 280/788 |
| 2015/0314811 | A1* | 11/2015 | Shibata | B62D 25/082 |
| | | | | 296/193.09 |
| 2017/0001668 | A1* | 1/2017 | Rioult | B62D 25/087 |
| 2017/0008570 | A1* | 1/2017 | Mildner | B62D 25/088 |
| 2017/0197665 | A1* | 7/2017 | Kabayama | B62D 25/088 |
| 2017/0320522 | A1* | 11/2017 | Lorenz | B62D 21/11 |

OTHER PUBLICATIONS

French Search Report dated Sep. 24, 2014 in FR 1450550 Filed Jan. 23, 2014.

* cited by examiner

BODY STRUCTURE OF A MOTOR VEHICLE WITH REINFORCEMENTS FOR DISTRIBUTING THE FORCES LINKED TO A REAR SHOCK ABSORBER OF THE VEHICLE

BACKGROUND

The invention relates to body structures of a motor vehicle and more particularly to the anchoring points on these bodies of the rear shock absorbers of the vehicle.

With the development of electric or hybrid vehicles, vehicle architectures in which the rear floor of the vehicle is raised, that is to say it is in line with the top of the wheel arch cutouts instead of being located at an intermediate height between the bottom of the body and the top of the wheel arch, are being observed increasingly frequently.

These raised floors for example make it possible to free space in order to place batteries of electric accumulators. The shock resistance requirements of the vehicle, in particular resistance to certain types of rear shock, applied at a standard height with respect to the vehicle, are rather favorable with a low positioning of the side members of the longitudinal structural reinforcements of the vehicle.

So as to be able to both free this space necessary for the positioning of the batteries and satisfy the rear shock requirements, certain vehicle architectures thus have side members which are locally offset upwardly at the rear of the vehicle. Due to this offset, the rear side member, with equal section, is subjected to a greater deformation in the event of a shock than an equivalent rectilinear side member.

In addition, the rear end of the side member in these architectures is no longer positioned facing the standard point of impact in rear shock tests.

It is then necessary to increase the section and therefore the mass of the side members, and to add complementary structure portions intended to transfer the energy of the impact from the height at which the impact is applied towards the front of the side member.

Another problem encountered by the raising of the rear floor of the vehicle is that the shock absorber attachment cups, which are conventionally attached to the side member, tend to be located below the floor of the vehicle and are no longer optimally connected to the top part of the body. They therefore cannot be in synergy with this top part of the body in order to dissipate some of the forces transmitted by the shock absorber.

BRIEF SUMMARY

The object of the invention is to propose a motor vehicle body structure which makes it possible to limit the total mass of the body whilst being able to assure a good resistance of the vehicle to rear shock and to assure a favorable distribution of the stresses created by the fixing points of the shock absorbers, in particular of the rear shock absorbers of the vehicle.

For this purpose, the invention proposes a motor vehicle body structure. The body structure comprises two longitudinal and substantially parallel reinforcing rear side members, comprises a side body superstructure connected to the side members, the side superstructure rising above the side members and defining, on either side of the vehicle, two wheel arch housing portions of the vehicle, each housing being able to accommodate at least one wheel. The two wheel arch housing portions are connected by a floor, which is vertically offset relative to the side members and positioned above the side members. The side members preferably comprise a portion of rear side members of the vehicle, the floor is a rear floor of the vehicle, and the cups are located at a rear wheel arch of the vehicle. The structure comprises, at each wheel arch housing portion, at least one shock absorber attachment cup assembled to the side superstructure, and assembled to a longitudinal reinforcing side member by means of a raising part connecting the cup and only a portion of the side member. The term "only a portion of the side member" means only a portion of the length of the side member in the longitudinal direction of the vehicle. The raising part has a width, measured in a longitudinal direction of the vehicle, that is substantially equal to that of the cup. The maximum width of the raising part can be typically between 0.9 and 1.3 times the maximum width of the cup, the term "width" being used here to designate a dimensional along the longitudinal axis of the vehicle. The raising part positions the cup above the side member, that is to say in a position vertically offset relative to the side member. The assembly points between the raising part and the side member are advantageously substantially aligned in a vertical direction with an edge of the cup. The vertical offset between the bottom of the cup and the closest point of the side member is preferably at least equal to the height of the cup. The vertical offset between the bottom of the cup and the closest point of the side member can be, for example, between two and ten times the height of the cup. The term "height" means a dimension measured on the part assembled in the vehicle in a vertical direction. The raising part thus has a width which makes it possible to transmit the vertical forces between the cup and the side member without closing the entire width of the vertical space between the floor and the side member. It is thus possible, with a part made with little material, to transfer the vertical forces of the shock absorber to the side member. Good lateral accessibility to the elements located between the wheels and beneath the floor is nevertheless maintained. The floor is advantageously placed above a top limit of the wheel arch openings visible on the external bodywork of the vehicle.

In accordance with an advantageous embodiment, the shock absorber attachment cup is positioned substantially in the horizontal extension of the rear floor. For example, the minimum height of the rear floor can be located between the assembled height from the base of the cup and a maximum height of an edge of the cup.

In accordance with a particularly advantageous embodiment, the cup comprises two substantially vertical first side walls, and the raising part has a beam geometry with a substantially U-shaped section, the axis of beam being oriented substantially vertically. At least two first parallel edges of the U-shaped section are placed in the extension of the two substantially vertical first walls of the cup. The two first parallel edges of the U-shaped section are preferably assembled, for example by welding, to the two substantially vertical first walls of the cup. The U-shaped section can be formed such that it changes between on the one hand the one or more points of attachment to the side member and on the other hand the assembly zones between the cup and raising part. The U might not be entirely symmetrical, and the height of the edges of the U can increase between the side member and the cup. At the assembly zones with the cup, the height of the U can be selected so as to be sufficient for the edges of the beam to entirely surround, at least in a transverse sectional plane of the beam, the two first walls of the cup. The two first walls can be entirely doubled, over their vertical portion, by two first edges of the U-shaped beam.

In accordance with one embodiment, the cup has at least one third side wall, preferably vertical or oblique, joining the two first walls, and the cup has a substantially horizontal base wall joining the two first walls and placed so as to continue on from the third wall. The term "oblique" here means a direction which is neither vertical nor horizontal, the vehicle being placed in a conventional position of travel on a flat road. The third wall can also be curved and can comprise at least one vertical or oblique portion.

In accordance with a preferred embodiment, the open side of the U-shaped section of the raising part is turned towards the lateral side of the vehicle which is the outer side of the vehicle, and the third side wall of the cup is located on the outer side of the vehicle, that is to say is located on the open side of the U. The cup cannot have a fourth side wall, or can have a fourth side wall facing the third wall. The first, second, third and fourth wall can each be connected to the base wall of the cup by a curved wall portion so as to limit the concentration of stresses at the zones of transition between the base wall of the cup and at least one of the side walls of the cup. The side walls of the cup preferably comprise at least one vertical wall portion for at least two side walls. In accordance with a preferred embodiment, the height of the fourth wall is less than the height of the third wall, and the fourth wall of the cup is located on the inner side of the vehicle. Further embodiments are of course conceivable. The third and the fourth walls of the cup can be of substantially equal height, or the taller wall can border the cup from the inner side of the vehicle. The open side of the U can be turned towards the inside of the vehicle and/or the base of the U can be located so as to continue on from the third wall.

The base wall of the cup can typically be drilled so as to accommodate for example an attachment screw of the shock absorber.

A reinforcing part can be assembled on the base of the cup so as to increase the resistance to flexion of the base of the cup. Ribs can be formed by stamping so as to connect, over a curved path, the base of the cup and at least one of the side walls of the cup so as to stiffen the cup overall and facilitate the transmission of forces between the base of the cup where the end of the shock absorber is assembled and the walls of the cup connected to the sides of the U-shaped beam.

In accordance with a particularly advantageous embodiment, the cup is assembled by edges of the two first walls and of the third wall to the same wheel arch part belonging to the side superstructure, the wheel arch part defining at least a substantially oblique surface portion around the edges of the cup and extending beyond the cup in a substantially oblique plane. A wheel arch part most often contributes to delimiting a housing accommodating a sole wheel of the vehicle, but in certain variants a housing could accommodate a plurality of wheels of two adjacent axles. The assembly between the two first walls, the third wall and the wheel arch part can be implemented advantageously by soldering two first edges of the two first walls, and a third edge of the third wall which are folded so as to be located substantially in a common plane with an inner edge of an opening of the wheel arch part. In accordance with a preferred embodiment, the cup is open upwardly, that is to say the shock absorber comes to bear against the base of the cup by resting against the outside of the cup. The cup is preferably assembled to the side superstructure in such a way that the opening of the cup is flush from underneath with an opening of the wheel arch. This orientation of the cup makes it possible to assemble the cup by three of its vertical walls to the U-shaped beam, and makes it possible to assemble the cup, by the edges of the cup, to the wheel arch part. The distribution of forces of the shock absorber between the U-shaped beam and the wheel arch part is thus optimized. In accordance with an advantageous embodiment, the wheel arch part has a lower edge which is in line with an edge of the floor and which is assembled to this edge of the floor.

The cup is also advantageously assembled to the wheel arch part along an edge which extends along the base wall of the cup, or along an edge which extends along a fourth wall of the cup. In accordance with an advantageous embodiment, the third wall of the cup can be doubled by a central portion of the U-shaped beam, the central portion being the central strip of the beam joining the two strips forming the sides of the U of the beam. In accordance with another embodiment, it is an edge of the base of the cup, or it is the fourth wall, or it is an edge of the fourth wall which is assembled to the central portion of the U-shaped beam. The U-shaped beam thus surrounds the cup on at least two faces, and preferably on three faces. The faces in question are the first wall, the second wall, and one of the third or fourth wall.

The raising part is preferably assembled to the cup at least at a number of different points of each of the two first walls of the cup. The raising part is preferably assembled to the cup at least at three points of each of the two first walls of the cup. In accordance with an advantageous embodiment, the raising part can also be assembled directly to the wheel arch part along certain portions of the inner edge of the opening of the wheel arch part.

In accordance with a particularly advantageous embodiment, the body structure comprises at least one substantially vertical structural sheet, the structural sheet being parallel to at least one of the sheets forming the branches of the U of the section of the raising part. The structural sheet extends above the cup, is connected to the oblique surface portion of the wheel arch part, and is simultaneously connected to a substantially vertical surface portion of the superstructure. The term "substantially vertical" here means having an inclination of $+15°$ relative to the vertical. The structural sheet typically comprises a portion having a main plane parallel to the planes of the edges of the U-shaped section of the raising part, and comprises assembly tabs making it possible to connect this main plane on one side to the wheel arch part and on another side to a substantially vertical surface portion of the superstructure situated above the wheel arch part. The term "extends above the cup" means that a portion at least of the structural sheet is located in a position along a vertical axis that is above the highest edge of the cup. The highest edge of the cup preferably corresponds to the edge turned from the outer lateral side of the vehicle. In accordance with a variant, the geometric plane of the main plane of the structural sheet can intercept the cup. In accordance with another variant, the geometric plane of the main plane of the structural sheet does not intercept the cup, but the distance between this geometric plane and the closest point of the cup is less than or equal to the greatest dimension of the cup. In this latter variant, the body structure preferably comprises at least two structural sheets positioned on either side of the cup relative to a longitudinal axis of the vehicle.

Thanks to this arrangement, the one or more structural sheets can play the part of a strengthening bracket and can assure a distribution of the vertical forces applied by the shock absorber at the cup towards the top of the body structure.

The distance between the plane of the structural sheet and the closest parallel plane of one of the planes of the profile of the U-shaped beam is advantageously less than or equal to the greatest dimension of the cup.

In accordance with an advantageous embodiment, the cup, the raising part and, as the case may be, the wheel arch part and the structural sheet are separate parts each made of sheet metal, for example sheet steel. Variants can be envisaged in which a number of these parts are made of the same sheet, for example the cup and the raising part are stamped from the same sheet panel and are connected without welding by one or more edges of the cup, and are possibly connected with welds by other edges of the cup.

The invention also relates to a motor vehicle comprising a rear reinforcing side member comprising a side body superstructure connected to the side member, the superstructure rising above the side member and defining, on either side of the vehicle, two wheel arch housing portions on the right and left of the vehicle, the two wheel arch housing portions on the right and left being connected by a floor portion of the vehicle, the vehicle comprising, at each wheel arch housing portion, at least one rear shock absorber attachment cup which is integrated in the wheel arch housing portion and which is assembled to the side member by means of a raising part forming a beam connecting the cup and only a portion of the side member, having a width, measured in a longitudinal direction of the vehicle, that is substantially equal to that of the cup.

BRIEF DESCRIPTION OF THE DRAWINGS

Further objectives, features and advantages of the invention will become clear upon reading the following description, which is provided solely by way of non-limiting example and with reference to the accompanying drawings, in which.

DETAILED DESCRIPTION

Figure 1:
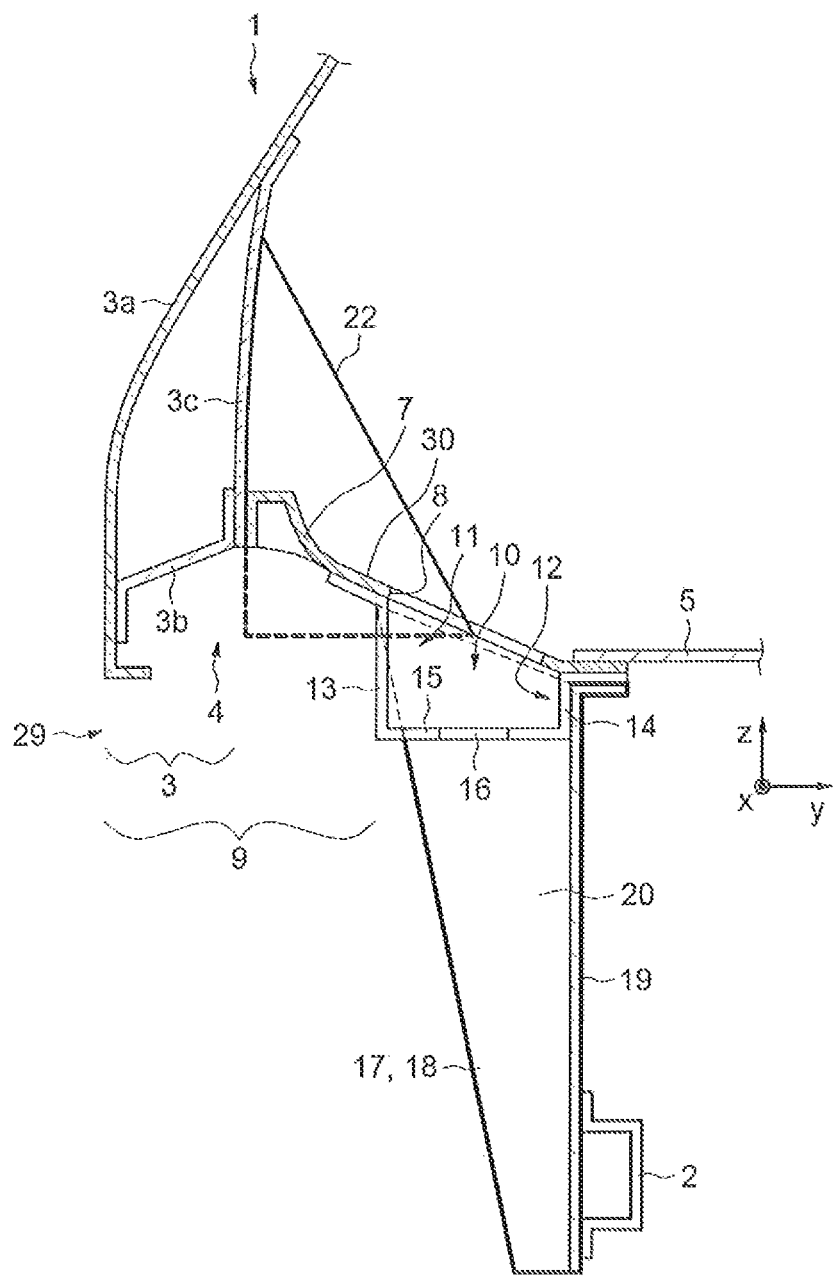
FIG. 1 is a simplified sectional view of a portion of the body structure according to the invention.
Figure 2:
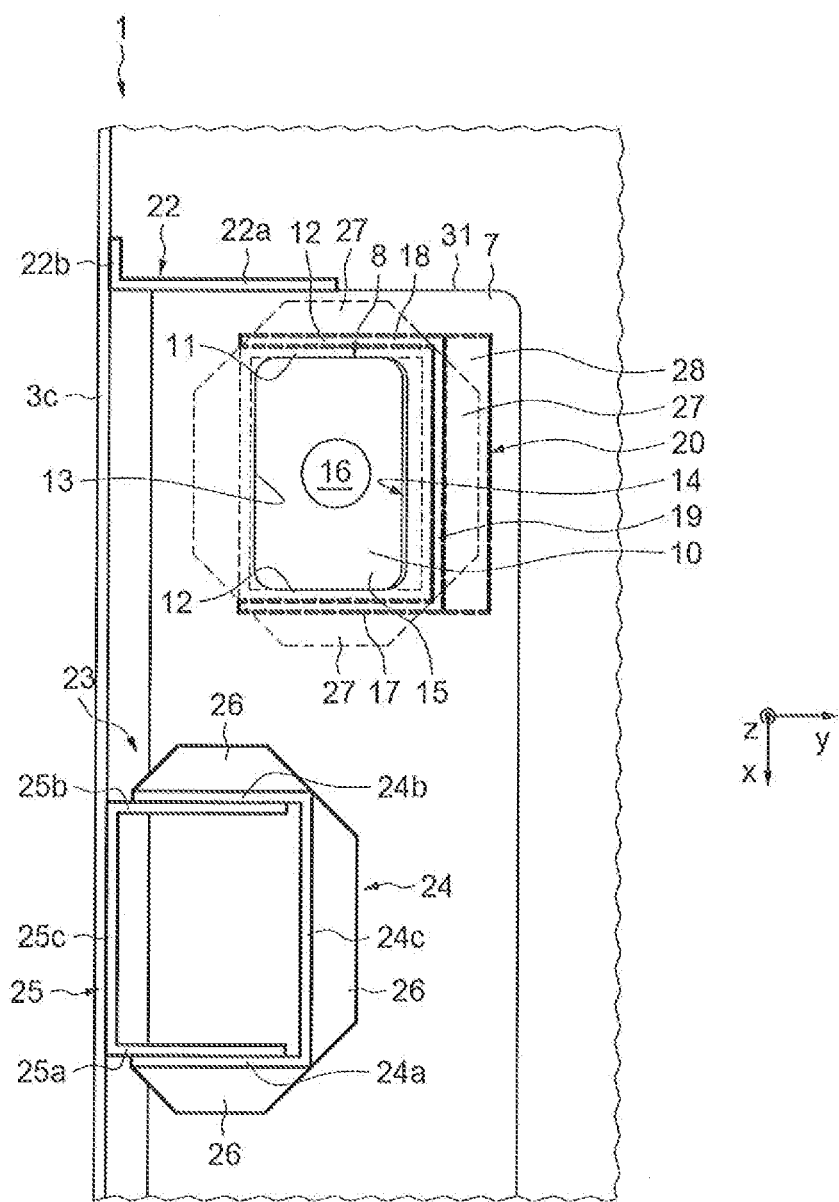
FIG. 2 is a view from above of the portion of the body structure of FIG. 1.
Figure 3:
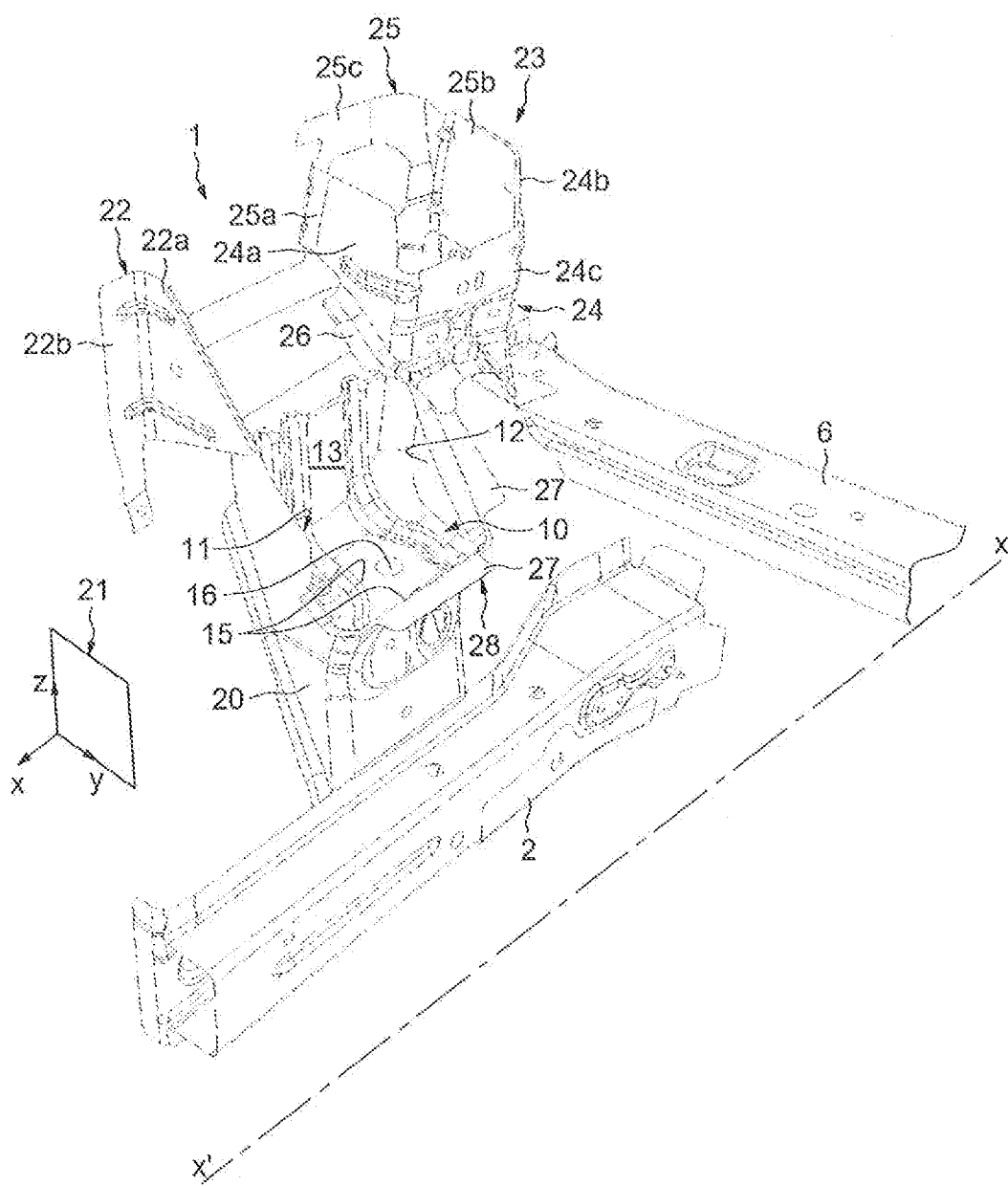
FIG. 3 is a perspective view of some characteristic elements of another body structure according to the invention.

In FIGS. 1, 2 and 3, the axis x represents longitudinal axis of the vehicle, the axis y represents a transverse axis of the vehicle, and the axis z represents a vertical axis.

The structures shown in FIGS. 1, 2 and 3 are present at least twice on the vehicle with, in each case, two structures symmetrical with respect to an axis parallel to the axis x and passing through the middle of the vehicle.

As illustrated in FIGS. 1 and 2, a body structure 1 of a motor vehicle (not shown) according to the invention comprises a side member 2 disposed longitudinally along the vehicle and extending at least in part to the rear of the vehicle, comprises a substantially vertical portion 3 of a side superstructure 9 in which there is formed a wheel arch opening 29 making it possible to mount a wheel on the vehicle beneath the side superstructure 9, and comprises a rear floor 5 which is raised, that is to say placed vertically above the side members 2.

The rear floor 5 is not necessarily directly above the side members 2 but is in any case vertically offset upwardly relative thereto. The floor 5 is connected to the side superstructure 9 by a wheel arch part 7 which defines at least an oblique surface portion 30 and which is assembled, from the inner side of the vehicle (relative to a transverse direction of the vehicle), to the rear floor 5, which is assembled, from the outer side of the vehicle, to the side superstructure 9.

The side superstructure 9 comprises at least a substantially vertical portion 3, which for example can comprise an outer rear end portion 3a comprising an outer finishing sheet, an inner rear end portion 3c on which there are assembled various interior elements of the vehicle, and a spacer rear end portion 3b connecting the outer rear end portion 3a and the inner rear end portion 3c so as to leave an empty space between the inner and outer portions so as to facilitate the assembly of various elements on the inner portion 3c. The spacer portion 3b defines a radially outer portion of a wheel arch housing 4 within which a wheel of the vehicle can be inserted by being passed through the opening 29. The rest of the depth (along the axis y) of the wheel arch housing 4 is defined by the wheel arch part 7.

A shock absorber attachment cup 10 is assembled on the wheel arch part 7. An opening 8 is formed in the wheel arch part 7, beneath which the cup 10 is assembled from below the wheel arch part 7, the edges of the cup 10 coming into abutment on the wheel arch part 7 and being assembled thereon around the opening 8. The base 15 of the cup 10 is offset downwardly relative to the wheel arch part 7.

The base 15 can be drilled by a bore 16 enabling the assembly of the end of the rear shock absorber (not shown). This base 15 can potentially be doubled by a strengthening sheet (not shown).

The cup 10 is connected to the side member 2 by a raising part 20, which thus connects the side superstructure 9 to the side member 2.

The raising part 20, as can be seen in the view from above of FIG. 2, has a U-shaped beam section, the two arms 17, 18 of the U extending along the transverse axis y of the vehicle, and the base 19 of the U extending along the axis x. The raising part 20 is welded or otherwise assembled on the side member 2 and is also connected, by the portions forming the arms 17, 18 of the U, to the cup 10. The raising part 20, as can be seen in FIG. 2, surrounds the cup 10, which has a substantially rectangular or square contour. The cup 10 has a first cup wall 11 and a second cup wall 12 which are substantially parallel to the transverse axis y. The cup 10 has a third cup wall 13 extending along the cup towards the outside of the vehicle (relative to the axis y) and a fourth wall 14, which potentially can be of zero height and extends along the cup 10 towards the inside of the vehicle.

Elements common to FIG. 1 can of course be found in FIG. 2, the same elements being represented by the same references. In order to facilitate the drawing, the floor 5 and the side member 2, however, have not been shown in FIG. 2.

The raising part 20 has a U-shaped section, this section comprising a first parallel edge 17 and a second parallel edge 18 both parallel to the transverse axis y of the vehicle (or at least forming an angle symmetrical with respect to this transverse axis y of the vehicle) and has a third edge 19 which forms the base of the U-shaped section and which is substantially parallel to the longitudinal direction x of the vehicle.

The first and second walls of the cup are substantially vertical or end by a substantially vertical portion. The first edges, second edges and base edges of the U-shaped section of the raising part 20 also form substantially vertical planes. The first and the second parallel edges of the raising part 20 are assembled to the first and second wall, respectively, 11 and 12 of the cup 10. The third edge or base edge of the U-shaped section is assembled here to the fourth wall of the cup situated on the inner side of the vehicle. Variants can be envisaged in which this third edge of the raising part 20 is assembled to the third wall of the cup located on the outer side of the vehicle.

The cup 10 is assembled on the wheel arch part 7 by tabs 27 extending along the edges of the first, second, third and fourth walls of the cup 10.

The raising part 20 can also have one or more tabs 28 making it possible to connect the raising part 20 to the wheel arch part 7, possibly by inserting a tab 27 of the cup 10 between a tab 28 and the wheel arch part 7.

As can be seen both in FIGS. 1 and 2, the body structure 1 of the motor vehicle also comprises a structural sheet 22 substantially in the form of a bracket. The structural sheet 22 comprises at least one substantially vertical force take-up portion 22a, which is substantially parallel to the first wall 11 and to the second wall 12 of the cup 10, and also to the first parallel edge 17 and to the second parallel edge 18 of the raising part 20.

All of these vertical portions 22a, 11, 12, 17, 18 of parts of the body structure are parallel to a vertical and transverse geometric plane 21 of the vehicle. The plane 21 is shown in FIG. 3 and, as guiding axes, has the axes y and z. Variants can be envisaged in which the plane 21, which is common to the structural sheet 22, to the first and second walls 11, 12 of the cup 10, to the first and second parallel edges 17, 18 of the U-shaped section of the raising part 20, is not strictly vertical, or is not strictly transverse to the vehicle.

The plane 21, however, preferably remains inclined by less than 10° relative to the vertical and preferably remains inclined by less than 5° relative to the vertical.

The inclination of the plane 21 relative to the axis y may be dependent on a local curvature of the side member 2 on which there is assembled the raising part 20. The plane 21 can then be perpendicular to the side member. Variants can be envisaged in which the first and second edges 17, 18 of the raising part 20 would not be parallel, but would be converging or diverging (with a view of a transverse section of the beam forming the raising part). The first and second cup walls 11, 12 can then be converging or diverging so as to assemble the first cup wall to the first edge of the raising part, and the second cup wall to the second edge of the raising part. A structural sheet 22 can then be positioned so as to be parallel to the first or second cup wall 11, 12 depending on which is the closest to the structural sheet 22, or can be in a transverse plane of the vehicle.

The structural sheet 22 is placed in the proximity of at least one of the first or second cup wall so as to be able to effectively take up some of the vertical forces transmitted by the shock absorber to the cup 10 then by the cup 10 to the wheel arch part 7. The structural sheet 22 may comprise a portion 22b, which is also vertical and substantially perpendicular to the force take-up portion 22a. The portion 22b is assembled to the inner rear end portion 3c and makes it possible to transfer the vertical forces received by the force take-up portion 22a towards the inner rear end portion 3c. The structural sheet 22 is also connected to the wheel arch part 7, over at least a portion of the lower edge of the force take-up portion 22a. An assembly tab (not shown) of the structural sheet 22 can form an angle with the portion 22a and can be assembled on the oblique surface portion 30 of the wheel arch part 7. In accordance with another variant, the force take-up portion 22a can be assembled at the lower part to a substantially vertical portion 31 of the wheel arch part 7, extending along the wheel arch part 7 in a plane direction substantially perpendicular to the lower rear end portion 3c. In accordance with yet a further embodiment, which can combine the previous embodiments, the structural sheet 22 can be assembled via its portion 22a to a third part (not shown) comprising a sheet portion also parallel to the plane 21 and positioned in the extension of the force take-up portion 22a, this third part being itself also connected to the wheel arch part 7.

Thus, the vertical forces transmitted by the rear shock absorber (not shown) to the cup 10 can be transmitted via the edges of the cup 10 through the raising part 20 towards the side member 2 and can also be transmitted in part via the cup 10 towards the wheel arch part 7, then via the structural sheet 22, then towards the side superstructure 9, of which the direction is favorable for the take-up of vertical forces. Variants in which the wheel arch part 7 is not oblique, but is horizontal, can be envisaged.

In order to promote the transfer of vertical forces towards the upper part of the body structure, in particular towards the side superstructure 9, the structural sheet 22 is located in the proximity of the cup 10, typically at a distance less than the greatest dimension of the cup itself, this minimal distance being observed both with regard to the distance along the axis x and with regard to the distance along the axis y.

In accordance with an advantageous embodiment, the structural sheet 22 is assembled to the wheel arch part 7 such that the total assembly length along the axis y, between the structural sheet 22 and the wheel arch part 7, is at least equal to half, and preferably two thirds, of the minimal distance along this axis between one of the side walls of the cup and a substantially vertical surface portion of the superstructure, for example the inner rear end portion 3c. In certain particularly advantageous embodiments, the total assembly length is even greater than this minimal distance, such that a portion of the structural sheet 22 extends along at least a portion of a side wall 11, 12 of the cup 10. The take-up by the structural sheet of forces transmitted via the cup 10 to the wheel arch part 7 is thus improved.

The structural sheet 22 can be assembled to the wheel arch part 7 by tabs parallel to the oblique surface portion 30 of the wheel arch part. 7, or by a portion of the wheel arch part 7 which is, by contrast, vertical and assembled on a vertical portion of the structural sheet 22.

The structural sheet 22 can furthermore result from an assembly of a plurality of parts each including at least a substantially planar portion parallel to the axis 21, all the portions parallel to the axis 21 being assembled so as to form a force transfer plate connected both to the wheel arch part 7 and connected to the portion 3 of the side superstructure 9.

In order to further improve the transfer of vertical forces from the wheel arch part 7 in the vicinity of the cup 10 to the side superstructure 9, further vertical force transfer elements can be added, which are connected both to the wheel arch part 7 and the side superstructure 9.

These elements preferably include one or more vertical planes connecting the wheel arch part 7 and the side superstructure 9. These vertical planes are preferably, at least in some cases, parallel to the plane 21 and parallel to the first and second walls 11, 12 of the cup 10. At least one of these vertical parallel planes is located in the proximity of the cup 10, that is to say at a distance along the axis x and at a distance along the axis y which is smaller than the greatest dimension of the cup.

Thus, a belt retractor compartment 23 comprising a front part 24 and a rear part 25 can be seen in FIG. 2. The rear part 25 comprises a base portion 25c adjacent to, and fixed on, the lower rear end portion 3c and comprises two side walls 25a and 25b parallel to the force transmission plane 21.

The compartment 23 also comprises a front part 24 comprising a front wall 24c parallel to the rear wall 25c and comprising two side walls 24a and 24b assembled on the side walls 25a and 25b of the rear part 25. The front part 24 additionally comprises assembly tabs 26 making it possible to connect the bottom of the front part 24 to the wheel arch part 7.

The assembly tabs 26 extend along a length greater than at least half the length along the axis y of the side walls 24a and 24b so as to be able to effectively transmit the vertical forces from the wheel arch part 7 towards the retractor compartment assembly 23 and then towards the side superstructure 9.

The retractor compartment 23 is not visible in FIG. 1 because it is located in front of the plane of section of this figure.

FIG. 3 is a perspective illustration of a body structure similar to that shown in FIGS. 1 and 2. Elements common to FIGS. 1 and 2 can be found in FIG. 3, the same elements being designated by the same references. In particular, a raising part 20 in the form of a beam with a U-shaped transverse section, the edges of the U surrounding the side walls of a shock absorber attachment cup 10, can be seen in FIG. 3.

The wheel arch part 7 has not been shown in FIG. 3 in order to better see the contours of the cup 10 and of the raising part 20. By contrast, in FIG. 3, the structural sheet 22 in the form of a bracket and a belt retractor compartment 23 can be seen, the belt retractor compartment being disposed this time towards the rear of the vehicle relative to the structural sheet 22.

In FIG. 3, the floor 5 has not been shown, but a rear floor crossmember 6 has been shown, indicating the assembly height of the floor.

Thanks to the body structure according to the invention, a space can be provided beneath the rear floor of the vehicle whilst maintaining good resistance to the rear shocks of the vehicle thanks to a low position of the longitudinal reinforcing side members.

The raising part 20, which represents a reduced material cost, makes it possible to transmit the forces of the rear shock absorber (not shown) towards the reinforcing side member 2. The force transfer elements 22, 23 make it possible to transmit the forces of the rear shock absorber (not shown) towards the side superstructure 9.

The invention is not limited to the described exemplary embodiments and can be implemented in numerous variants. A body structure including a raising part 20 as described above and not including the structural parts 22 can be envisaged.

A body structure in which the cup 10 would be connected to the side member 2 by a part other than the previously described U-shaped beam and including, by contrast, one or more structural sheets 22 and/or a force transfer element in the form of a box such as the retractor compartment 23 can be envisaged.

The preferential plane 21 for the take-up of vertical forces might not be parallel to the transverse axis y of the vehicle. The cup could be assembled such that the base of the cup is turned towards the top of the vehicle. The raising part 20 in the form of a U-shaped beam could have the opening of the U turned towards the interior of the vehicle. The raising part 20 could have a form surrounding the cup 10 in the upper portion, and could transition into a beam of different section in the lower portion, for example into a closed rectangular section or a closed triangular section. The contour as viewed from above of the cup itself could be triangular or trapezoidal. The portion of the beam surrounding the cup can have a closed section surrounding all the side walls of the cup. It could be that the height of the rear floor does not correspond to the bottom of the opening of the wheel arch part 7 accommodating the cup 10.

Assemblies that can be disassembled could replace all or part of the welded assemblies connecting the side member 2, the raising part 20, the cup 10, the wheel arch part 7, the structural sheet 22, the front part 24 and the rear part 25 of the belt retractor compartment 23.

The invention claimed is:

1. A body structure of a motor vehicle, comprising:
two substantially parallel longitudinal reinforcing side members;
a body side superstructure connected to the side members, rising above the side members and defining, on either side of the vehicle, two wheel arch housing portions of the vehicle, the two wheel arch housing portions being connected by a floor portion of the vehicle, offset vertically relative to the side members and positioned above the side members;
at least one rear shock absorber attachment cup at each wheel arch housing portion, the at least one rear shock absorber attachment cup being assembled to the side superstructure, and assembled to a side member by a raising part that connects the cup with a portion of the side member, having a width, measured in a longitudinal direction of the vehicle, substantially equal to that of the cup.

2. The structure as claimed in claim 1, wherein the shock absorber attachment cup is positioned substantially in a horizontal extension of the rear floor.

3. The structure as claimed in claim 1, wherein the raising part has a beam geometry with a substantially U-shaped section, the axis of the beam being oriented substantially vertically, at least two first parallel edges of the U-shaped section being placed in the extension of two first substantially vertical side walls of the cup.

4. The structure as claimed in claim 3, wherein the cup has at least a third side wall joining the two first walls, and has a substantially horizontal base wall joining the two first walls and placed so as to continue on from the third wall.

5. The structure as claimed in claim 4, in which the cup is assembled by edges of the two first walls and of the third wall to the same wheel arch part belonging to the side superstructure, the wheel arch part defining at least a substantially oblique surface portion around the edges of the cup and extending beyond the cup in a substantially oblique plane.

6. The structure as claimed in claim 5, in which the cup is also assembled to the wheel arch part along an edge which extends along either the base wall of the cup, or a fourth side wall opposite the third wall and having a height shorter than the height of the third wall.

7. The structure as claimed in claim 3, in which the raising part is assembled to the cup at least at a number of different points of each of the first two walls of the cup.

8. The structure as claimed in claim 6, further comprising at least one structural sheet which has a substantially vertical direction and is parallel to at least one of the sheets forming the at least two first parallel edges of the U of the section of the raising part, the structural sheet extending above the cup, being connected to the oblique surface portion of the wheel arch part, and being connected to a substantially vertical surface portion of the superstructure.

9. The structure as claimed in claim 8, wherein a distance between the plane of the structural sheet and the closest parallel geometric plane of one of the planes of the profile of the U-shaped beam is less than or equal to a greatest dimension of the cup.

10. A motor vehicle, comprising:
- a longitudinal reinforcing side member;
- a body side superstructure connected to the side member, rising above the side member and defining, on either side of the vehicle, two wheel arch housing portions on the right and left of the vehicle, the two right and left wheel arch housing portions being connected by a floor portion of the vehicle;
- at least one rear shock absorber attachment cup at each wheel arch housing portion, the at least one rear shock absorber attachment cup, which is integrated in the wheel arch housing portion and which is assembled to the side member by a raising part forming a beam that connects, the cup with a portion of the side member, having a width, measured in a longitudinal direction of the vehicle, substantially equal to that of the cup.

* * * * *